LIONEL J. Du ROCHER
INVENTOR.

BY Harry M. Saragovitz
Edward J. Kelly
Herbert Berl
and M. V. Wallace
ATTORNEYS

United States Patent Office 3,534,549
Patented Oct. 20, 1970

3,534,549
DUST EVACUATING SYSTEM FOR GAS TURBINE
ENGINE ROTATING REGENERATORS
Lionel J. Du Rocher, St. Clair Shores, Mich., assignor to
the United States of America as represented by the
Secretary of the Army
Filed Dec. 4, 1968, Ser. No. 780,959
Int. Cl. F02c 7/10
U.S. Cl. 60—39.16                    3 Claims

ABSTRACT OF THE DISCLOSURE

An improved workable system to evacuate dust that becomes embedded in the rotating regenerator of a regenerative gas turbine engine. When this condition occurs the turbine inlet temperatures rise and if the regenerator is not relieved of the dust clogging condition, before the temperatures exceed their design limits, the turbines become quickly inoperative. This device relieves the dust clogging conditions during engine operation without any external assistance or air pressure source.

---

The invention described herein may be manufactured, used and licensed by or for the Government for governmental purposes without payment to me of any royalty thereon.

This invention relates to gas turbine engines, and more particularly to a new and improved workable system to evacuate dust that becomes embedded in the rotating regenerator of a regenerative gas turbine engine. When this condition occurs the turbine inlet temperatures rise and if the regenerator is not relieved of the dust clogging condition, before the temperatures exceed their design limits, the turbines become inoperative in a short period of time. The instant device relieves the dust clogging condition during engine operation without any external assistance or air pressure source. The system is entirely self-contained and has been found to be feasible for gas turbine application and military use, confirmed through laboratory tests.

The above and other objects of the invention will appear more fully from the following more detailed description and from the drawing, wherein.

Figure 1:
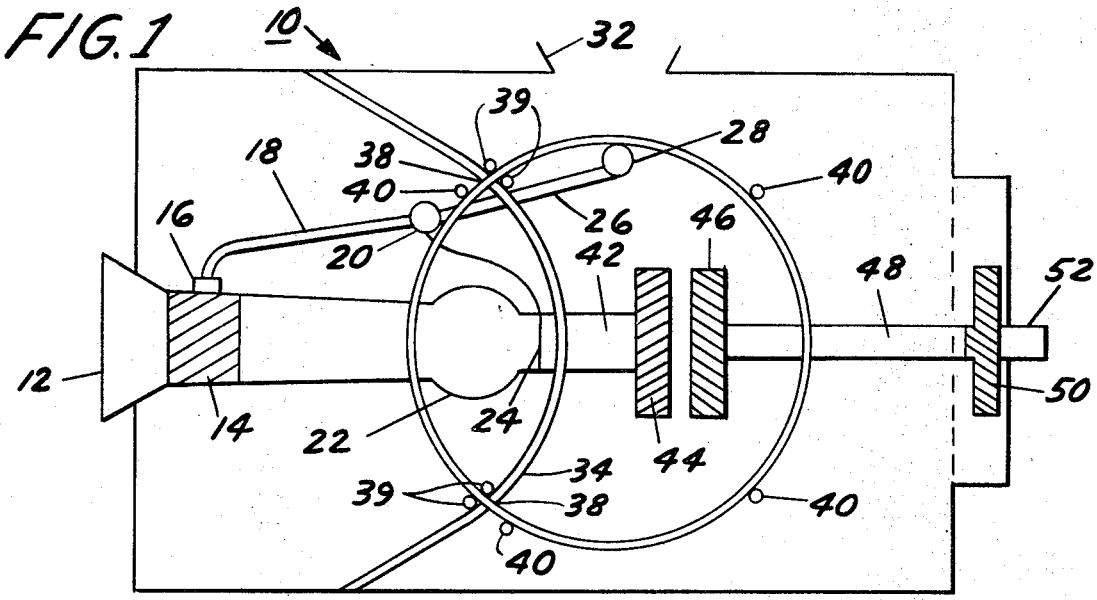
FIG. 1 is a side cutaway view of the invention showing the arrangements of the various operating parts.
Figure 2:
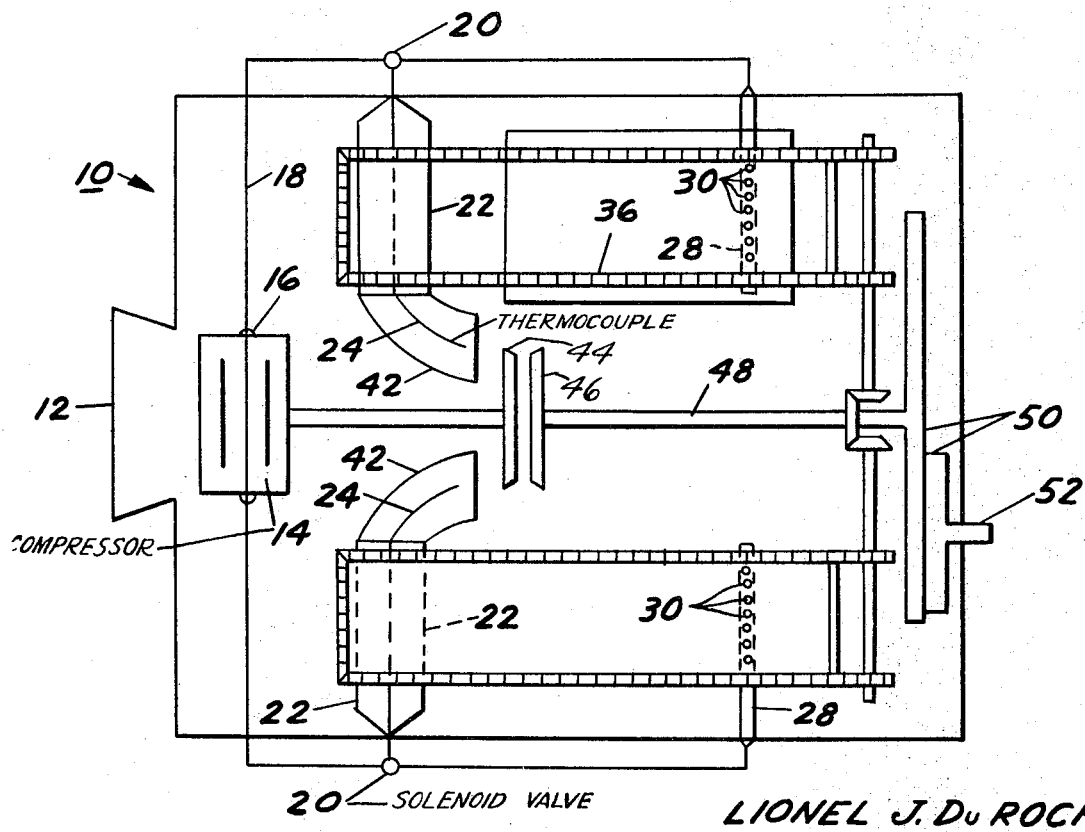
FIG. 2 is a schematic view of the device.

Referring now to the drawing, the numeral 10 designates a gas turbine engine housing having an air inlet 12 formed in one end thereof. Suitably mounted within housing 10, and adjacent air inlet 12, is a compressor 14 having mounted thereon a pair of opposed combustors 22. A compressor discharge outlet source 16 is provided which has connected thereto and leading therefrom an air pressure line 18 leading to an air solenoid 20.

A thermocouple 24 is provided, the same connecting the solenoid 20 and combustors 22. A duct 26 connects air solenoid 20 to opposed regeneration cleaning jet bars 28; said bars having a plurality of staggered openings 30 therein; said bars being located beneath a transverse exhaust opening 32 in top of housing 10.

A turbine air inlet 34 is provided, the same comprising an arc-shaped baffle member having opposed openings 38 therein to allow opposed rotating regenerators 36 to spin therein while rotating on bearings 40. Seals 39 insure proper closure of openings 38 while allowing free rotation of regenerators 36.

The manner in which the system operates is as follows:

Air enters the gas turbine engine housing 10 through air inlet 12 and flows into compressor 14 where it is compressed. The compressed air is then forced, at high velocity, into opposed combustors 22. While in the combustors the air is mixed with the fuel being used to operate the turbine, crude oil, or the like, and ignited the resulting gases under increased temperature, expand thereby increasing the velocity thereof.

Under conditions of normal operation the expanded gases produced by ignition, exit from opposed combustors 22 into combustor exit ducts 42 to the gasifier turbine 44 which drives compressor 14 and other accessories. The gases then pass through power turbine 46 which rotates shaft 48, gear assembly 50 and ultimately output shaft 52.

When the regenerators 36 become clogged with dust as described above, the temperature within the combustors 22 and combustor exit ducts 42 rise. When the temperature exceeds design limits, air solenoid 20, which is embedded in duct 18 and connected to compressor outlet 16, is actuated allowing air to pass from the compressor discharge outlet source 16 to the regenerator cleaning jet bars 28 (located in opposed position within opposed rotating regenerators 36 which in turn rotate on bearings 40). The regenerators pass through opposed openings 38 in arc-shaped baffle member 34 which acts as a divider between the hot and cold sections of the gas turbine engine housing 10. The regenerators 36 rotate at approximately 25 r.p.m.'s. Inasmuch as air solenoid 20 is energized by thermocouple 24, which is in turn activated by means of rising temperature, when the thermocouple 24 returns to its normal operating temperature, it will permit the solenoid to close, thereby returning it to its normal operating position. When this occurs the turbine will again operate without paying a penalty by bleeding air from compressor 14, for the regenerator cleaning system.

The rotating regenerators 36 are constructed of mesh material and form a drum which allows gases to pass through, along with fine size dust particles, said particles being larger than the very fine clog. The flow of exhaust gases through the regenerators is therefore slowed by the formation of the clog, this phenomenon in turn creating excessive turbine inlet temperatures. When this condition exists air is delivered under compressor discharge pressure from staggered openings 30 in jet bars 28 which in turn evacuates the impinged dust from the regenerators 36 and exhausts the dust to the atmosphere through exhaust duct 32. Under normal operating conditions, the exhaust gases pass through the mesh of the regenerator at a velocity of about 3 ft./sec. when the cleaning systems of this invention is temperature activated, the flow of air therethrough is at a velocity of about 70 ft./sec.

There has been disclosed herein a new and improved workable system to evacuate the dust that becomes imbedded in the rotating regenerators of a regenerative type gas turbine engine, by means of a temperature sensing solenoid located in a compressor discharge line which is functionally linked to an air jet bar. The unit can be set for any predetermined temperature so that when the chosen temperature is reached, the solenoids will open permitting air pressure to flow from a compressor discharge outlet through a solenoid to the air jet bar, thereby evacuating clogged dust that is the direct cause of excessive rise of turbine inlet temperature. As the temperature recedes to normal, the solenoid will close. The number of times the system will cycle depends on the dust concentration encountered during vehicle operation. The system is entirely self-contained.

While this invention has been described in connection with a particular embodiment thereof, it will be understood that it is capable of modification and this application is intended to cover any variations, uses, or adaptations following, in general, the principles of the invention and including such departures from the present disclosure as come within known or customary practice in the art to which the invention pertains, and as fall within the scope of the invention on the limits of the appended claims.

I claim:

1. A dust evacuating device for removing dust that has become imbedded in the rotating regenerators of a regenerative gas turbine engine, comprising, an engine housing, a compressor, an air opening inlet in said housing leading to said compressor, combustor means for mixing air and liquid fuel and combusting same, mounted adjacent said compressor and connected thereto by duct means and having exit ducts thereon, a gasifier turbine located adjacent said exit ducts to receive exhaust gases from said combustor and connected to said compressor to rotate same, a power turbine located downstream of said gasifier turbine for receiving exhaust gases from said gasifier turbine, means for transferring the energy produced by said power turbine to an output shaft, exhaust means, and means for transferring a portion of said energy to a pair of opposed screened regenerators located within said housing, said dust evacuating device comprising, a compressor discharge outlet source in said compressor, duct means connecting said outlet source to said screened regenerators, a thermocouple mounted in said exit ducts functionally connected to a solenoid, cleaning means connected to said exit ducts and located within and adjacent said regenerators, said solenoid being capable of predetermined temperature settings, so that upon clogging of said rotating screened regenerators with dust and overheating in said exit ducts, said thermocouple causes said solenoid to open and allow air to be bled from said compressor to said cleaning means, where it passes through said screened regenerators and out said exhaust means to atmosphere, and wherein once said regenerator screens are cleaned and temperature reduced in said exit ducts, said thermocouple causes said solenoid to close.

2. A dust evacuating device of claim 1, wherein, said regenerator cleaning means comprises a cleaning jet bar having openings therein, oriented perpendicular to the radii of said rotating regenerators.

3. A dust evacuating device of claim 1, wherein, said exhaust means comprises a transverse exhaust opening in said engine housing.

References Cited

UNITED STATES PATENTS

| | | | |
|---|---|---|---|
| 1,814,040 | 7/1931 | Hoglund | 165—5 |
| 2,865,611 | 12/1958 | Bentele | 165—5 |
| 2,893,697 | 7/1959 | Hryniszak. | |
| 3,000,617 | 9/1961 | Kitko. | |
| 3,116,605 | 1/1964 | Amann et al. | |
| 3,412,786 | 11/1968 | Taylor | 165—5 |

FOREIGN PATENTS 545,523  3/1952  Germany.

CARLTON R. CROYLE, Primary Examiner

U.S. Cl. X.R.

60—39.51, 39.24; 165—5